March 18, 1952 L. W. PARKER 2,589,285

COMMUNICATION SYSTEM

Filed Sept. 11, 1946 5 Sheets-Sheet 1

INVENTOR.
LOUIS W. PARKER

BY

R. P. Morris

ATTORNEY

March 18, 1952 L. W. PARKER 2,589,285

COMMUNICATION SYSTEM

Filed Sept. 11, 1946 5 Sheets-Sheet 2

INVENTOR.
LOUIS W. PARKER

BY

R P Morris

ATTORNEY

March 18, 1952 L. W. PARKER 2,589,285

COMMUNICATION SYSTEM

Filed Sept. 11, 1946 5 Sheets-Sheet 3

INVENTOR.
LOUIS W. PARKER

BY

ATTORNEY

March 18, 1952 L. W. PARKER 2,589,285

COMMUNICATION SYSTEM

Filed Sept. 11, 1946 5 Sheets-Sheet 4

INVENTOR.
LOUIS W. PARKER

BY

R P Morris

ATTORNEY

March 18, 1952 L. W. PARKER 2,589,285

COMMUNICATION SYSTEM

Filed Sept. 11, 1946 5 Sheets-Sheet 5

INVENTOR.
LOUIS W. PARKER
BY
R P Morris
ATTORNEY

Patented Mar. 18, 1952 2,589,285

UNITED STATES PATENT OFFICE 2,589,285

COMMUNICATION SYSTEM

Louis W. Parker, Jackson Heights, N. Y., assignor to Federal Telecommunication Laboratories, Inc., New York, N. Y., a corporation of Delaware Application September 11, 1946, Serial No. 696,119

6 Claims. (Cl. 178—19)

This invention relates to a method and means for communicating voltage variations over a single channel and more particularly to the application of such method and means to a telautograph communicating system.

In telautograph systems, the movement of a stylus or pencil across a writing surface is translated into horizontal and vertical voltage components which are ordinarily transmitted as such. Similar to the method used in transmitting television images, each such point as determined by its vertical and horizontal coordinates has to be framed by suitable vertical and horizontal synchronizing pulsations. In the application of such telautograph systems for use by the police as two way communication between police cars and a central station, great difficulties are apparent when ultra high frequencies are employed. Such a system thus applied is particularly difficult since, ultra high frequencies are subject to extreme attenuation and much interference when used among steel frame buildings which also cause multiple reflections with consequent confusion at the receiving end. While low frequency may be used from the central station to all cars simultaneously, communication toward the center must be done on ultra high frequencies if a great number of cars are in operation. It is obvious, of course, that only the use of ultra high frequency affords a sufficient number of separate communication channels.

It is an object of the present invention to provide a method and means for communicating the variation in at least two voltages simultaneously as applied to a telautograph communication system.

It is another object to provide a system of the type referred to which establishes communication by the transmission of information regarding the variation of two voltages over a single narrow channel.

Still another object is to provide a system which employs an average low power with extremely high peak powers at times as required.

It is still a further object to provide a system which transmits the variation of voltages by means of time modulated pulses having a low repetition rate.

Still a further object is to provide an improved synchronizing system for use with a communication system as referred to above.

In accordance with my invention, I provide a multiple telautograph system which utilizes pulses suitably modulated for conveying information regarding the variation of direct current potentials as they correspond to the vertical and horizontal displacement of a writing stylus. These direct current potentials are made to generate corresponding pulses which are displaced in time as referred to a synchronizing base depending on the amplitude of such potentials. The pulses conveying intelligence corresponding to the vertical and horizontal components of the stylus position are combined into a single pulse which carries the intelligence insofar as its position in time is varied with respect to the synchronizing signal or frame. A single source serves to synchronize both the transmitter and receiver with low radio frequencies carrying the synhcronizing pulses. The system thus transmits the intelligence pertaining to characters written by a stylus in the form of a single pulse for each synchronizing frame at peak power and in the form of a comparatively small number of pulses over a period of time. At the receiver, the ultra high frequency pulses are made to reproduce the motions of the transmitting stylus through the medium of a beam of a rotating cathode ray tube, preferably of the long persistence vision type. In accordance with another feature of the invention, I provide a method for synchronization or framing which avoids the displacement of the observed writing on the cathode ray tube due to the improper selection from a given number of synchronizing frames or cycles. This is done by enabling the selection of the proper cycle to be controlled by means of the intelligence carrying pulses.

A better understanding of my invention and the objects and features thereof may be had from a particular description of an embodiment thereof made with reference to the accompanying drawings, in which.

Figure 1:
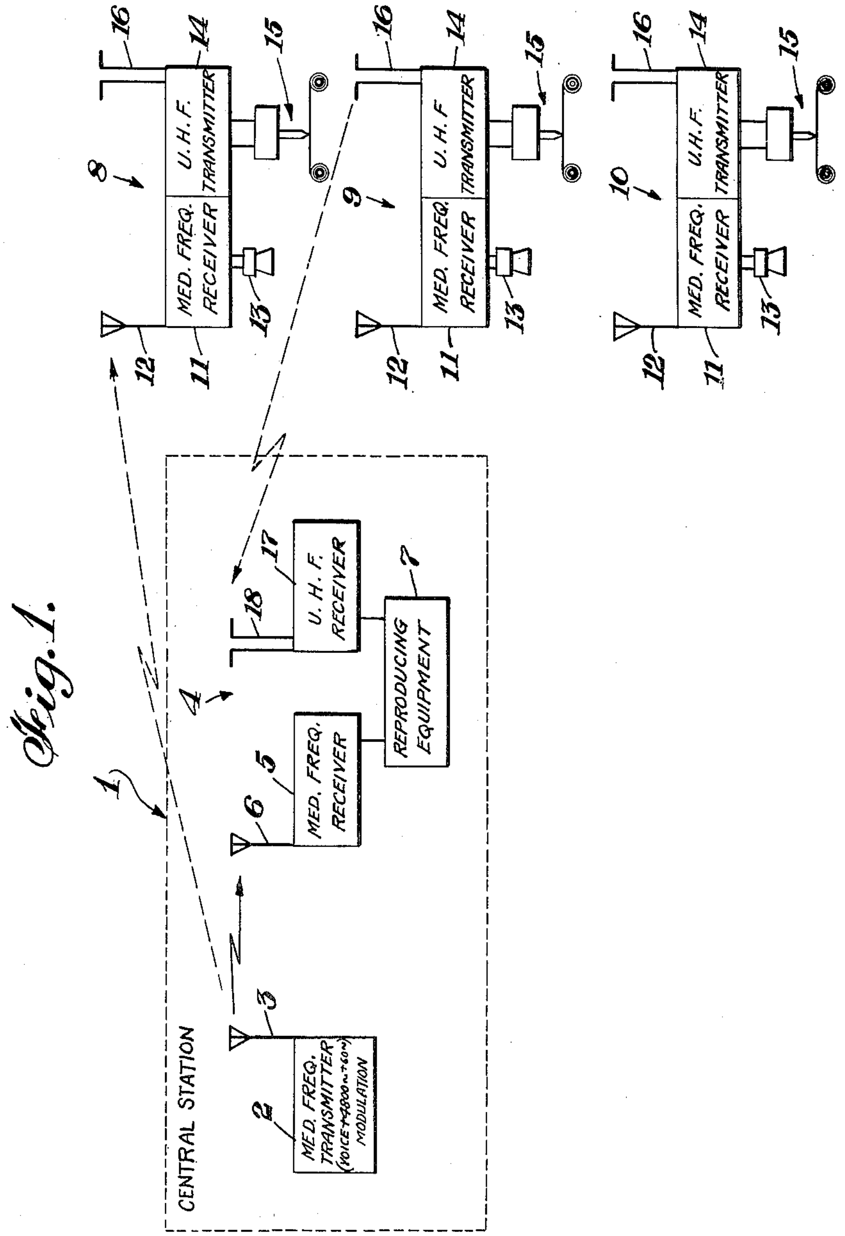
Fig. 1 is a diagram in block form illustrating a telautograph system including a central station transmitter receiver and a number of outside transmitter-receivers embodying my invention.

Referring to the system shown in Fig. 1, a central station unit indicated at 1 and blocked off in broken lines includes a medium frequency transmitter 2 including an antenna 3 which is adapted to continuously send out a radio frequency modulated by synchronizing frequencies at 4800 and 60 cycles as well as voice signals of a station operator. The central station also comprises a visual message reproducing unit 4 which includes a medium frequency receiver 5. The two synchronizing frequencies as emitted by the transmitter 2 are picked up by a suitable antenna 6 of the receiver 5 for synchronizing the operation of a reproducing cathode ray tube system at 7. It will, of course, be understood that the two audio frequencies for synchronizing are given here for purposes of illustrations only and may have other suitable values. A number of receiver-transmitter units as indicated at 8, 9 and 10 which may be placed within individual police prowl cars are provided with medium frequency receiver units as at 11 which receive the two synchronizing frequencies over an antenna 12 and also any voice signals that may be emitted from the transmitter 2 which are reproduced by means of loud speaker 13. The synchronizing signals picked up by receiver 11 are used to synchronize ultra high frequency transmitter 14 operatively associated with the respective receiver units. The transmitter includes a stylus or similar writing device 15 which serves to modulate the associated transmitters as at 14 in accordance with the vertical and horizontal displacements thereof. Signals, thus modulated at ultra high frequencies are sent out over antennas 16 to be picked up by a U. H. F. receiver 17 over a suitable antenna 18 at the central station. These signals are subsequently made to act on the beam of the cathode ray type reproducing tube at 7 to become visible thereon in the form of legible characters.

Figure 2:
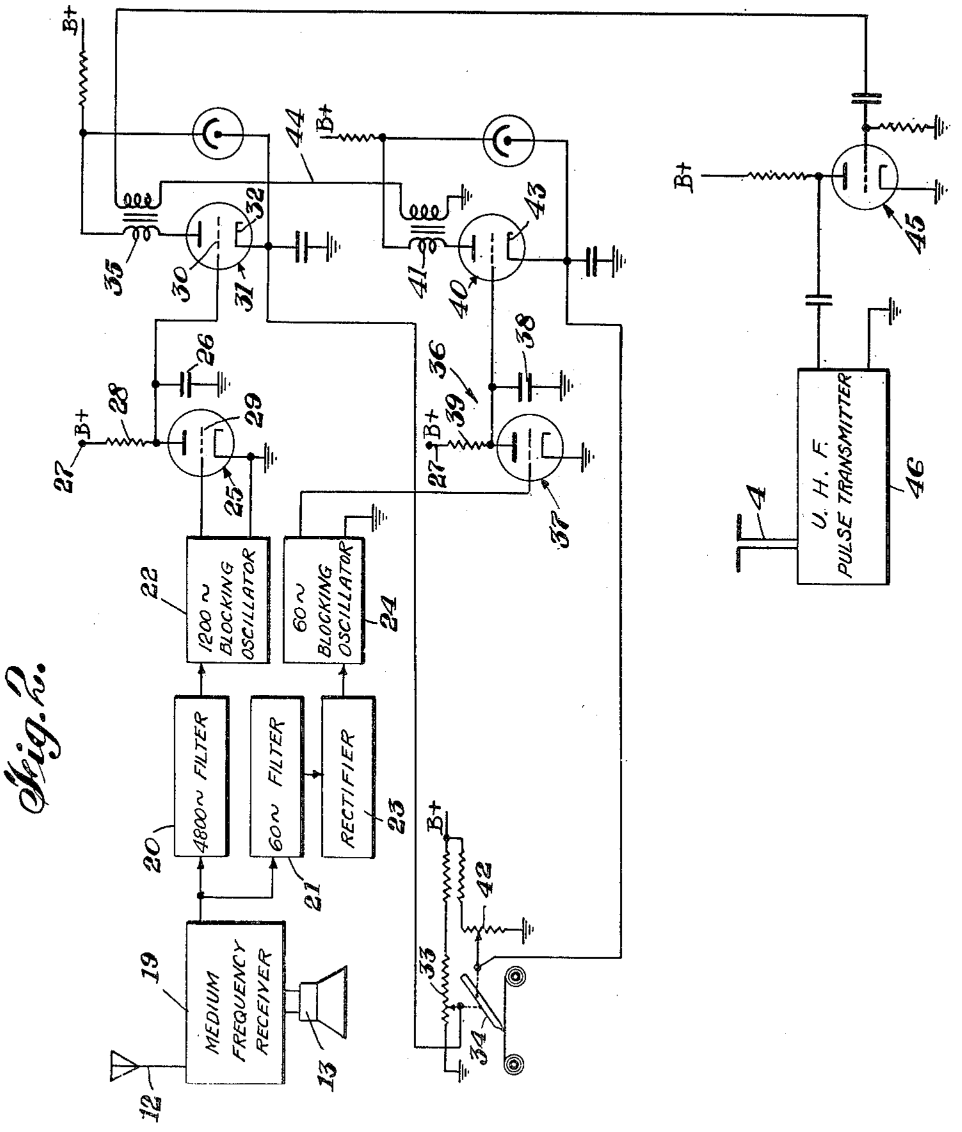
Fig. 2 is a diagram partly in block and partly in schematic form showing an outside transmitter-receiver circuit for the system of Fig. 1.

In Fig. 2, one of the prowl car transmitter-receivers as at 8 in Fig. 1 is shown to include the medium frequency receiver 19 for picking up signals from the synchronizing frequency transmitter 2. This receiver is equipped with a 4800 cycle filter 20 and a 60 cycle filter 21, these two synchronizing frequencies being continuously broadcast. The 4800 cycle output from the filter 20 is fed into a blocking oscillator 22, which has a repetition rate of 1200 cycles per second. The 60 cycle output, after filtering, undergoes a full wave rectification in a rectifying circuit 23. The A. C. component of the resulting pulsating unidirectional current is used for synchronizing a 60 cycle blocking oscillator at 24. It is to be noted that an alternative method for obtaining a synchronizing signal is described in connection with Fig. 7. The blocking oscillator 22 feeds into a sawtooth voltage generating circuit comprised of an electron discharge vacuum tube 25 across which a storage condenser 26 has been provided. The condenser 26 charges from a plate supply indicated at 27 over a resistor 28. The conductivity of the discharge tube 25 is controlled by the blocking oscillator pulsations as applied to grid 29 thereof. The condenser 26 has been selected so as to provide a peak potential which is considerably lower than the plate supply voltage whereby a substantiall linear rise in voltage thereacross is obtained. The sawtooth voltage thus obtained is applied to grid 30 of a high-mu triode 31. Cathode 32 of the tube 31 receives varying direct current voltages from a potentiometer 33 which is controlled by the respective horizontal movements of a stylus 34. Tube 31 is provided in its plate circuit with a high frequency transformer 35 which acts to differentiate the plate current and to generate a voltage across a secondary thereof. Similar circuits and arrangements have been provided for obtaining significant votlages for the vertical component coordinate of the stylus 34; these include a sawtooth generating circuit 36, having a discharge tube 37, synchronously controlled from the 60-cycle blocking oscillator 24, and a storage condenser 38 which is charged from the plate potential source 27 over a resistance 39. The resulting 60 cycle sawtooth voltage is applied to another high-mu triode shown at 40 which, in its plate circuit is similarly provided with a high frequency transformer 41. The triode 40 receives modulating direct current voltages from a vertical component coordinate potentiometer 42, the output of which is applied to cathode circuit 43. The secondaries of the transformers 35 and 41 are tied together over a connection 44 for supplying the combined vertical and horizontal intelligence carrying voltages to a peak rider triode 45. The peak rider 45 supplies inteligence conveying audio pulsations for modulating an ultra high frequency pulse transmitter 46 which emits outbursts of radio frequencies, with peak intensities which involve 10 to 50 kilowatts or more, the average power output, however, being about $^1/_{1000}$ of this peak value. Delaying for the present, the description of the graphs of Figs. 3, 4 and 5, which will be discussed in connection with the operation of the apparatus, reference is now made to the receiving apparatus as shown in Figs. 6 and 7 as they are used at a central station.

Receiving equipment for a central station includes a medium frequency receiver 47, and 4800 and 60 cycle filters 48 and 49 respectively, similar to those used in the prowl car receivers shown in Fig. 2. The receiver is also provided with 1200 and 60 cycle blocking oscillators 50 and 51 as well as sawtooth generating circuits 52 and 53. The resulting high and low frequency sawtooth voltages for horizontal and vertical sweeping are changed into sawtooth currents by the method used in television receivers, namely through the medium of vacuum tubes 54 and 55, and associated transformers 56 and 57. The respective high and low frequency sawtooth current waves are applied to suitable deflection coils 58 and 59 associated with a cathode ray tube 60 which is slowly rotated with respect to the two coils by means of a motor 61. The grid of this cathode ray tube is fed from the output circuit of an ultra high frequency receiver 62 which, by means of the antenna 18 mentioned in connection with Fig. 1, picks up the U. H. F. signals from one of the transmitting stations in the prowl cars. In the preferred type of cathode ray tube as shown, the image appears on the side of the tube as at 63, while the latter is being rotated at a peripheral velocity of about 1 centimeter per second. The screen of this tube is of the long persistence type retaining the image formed by consecutive dots for a few seconds or if desired up to a minute. These dots are about one millimeter in diameter and are located close enough to one another to form substantially a continuous line.

Figure 6:
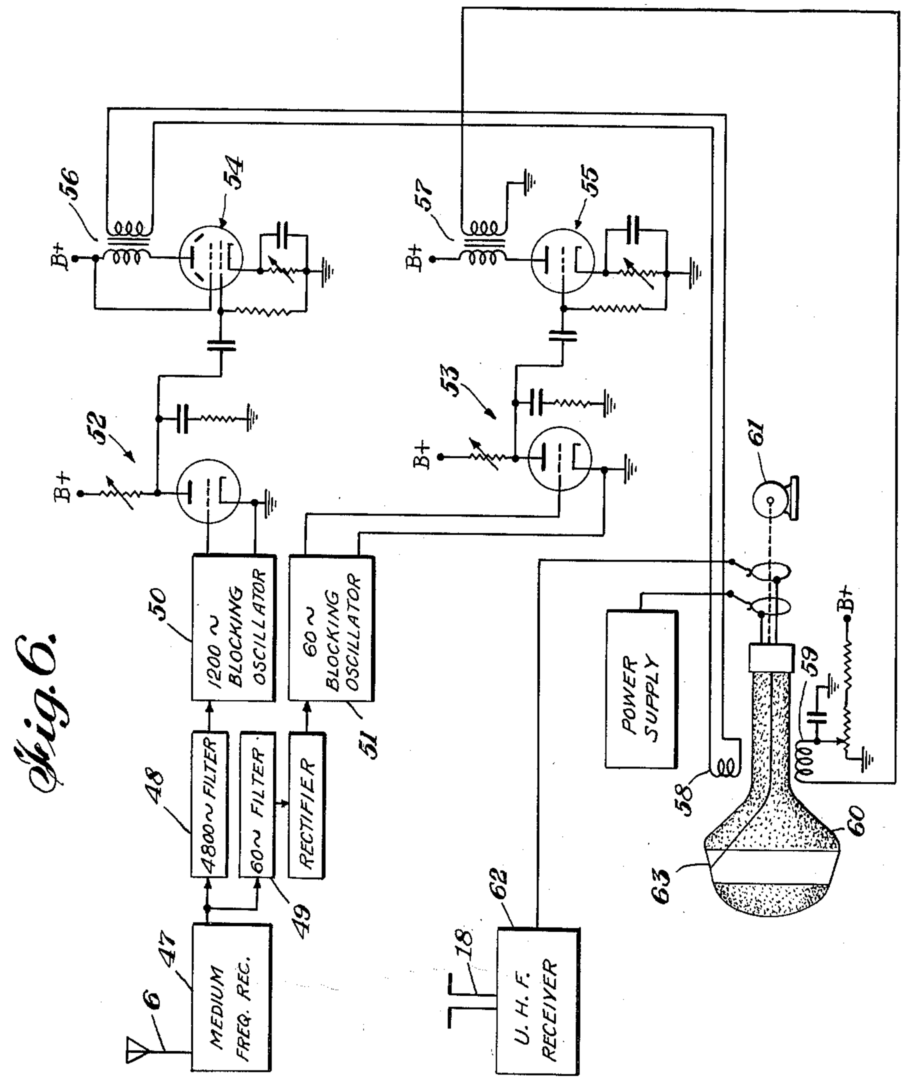
Fig. 6 is a diagram of a central station receiving circuit in block and schematic form.
Figure 7:
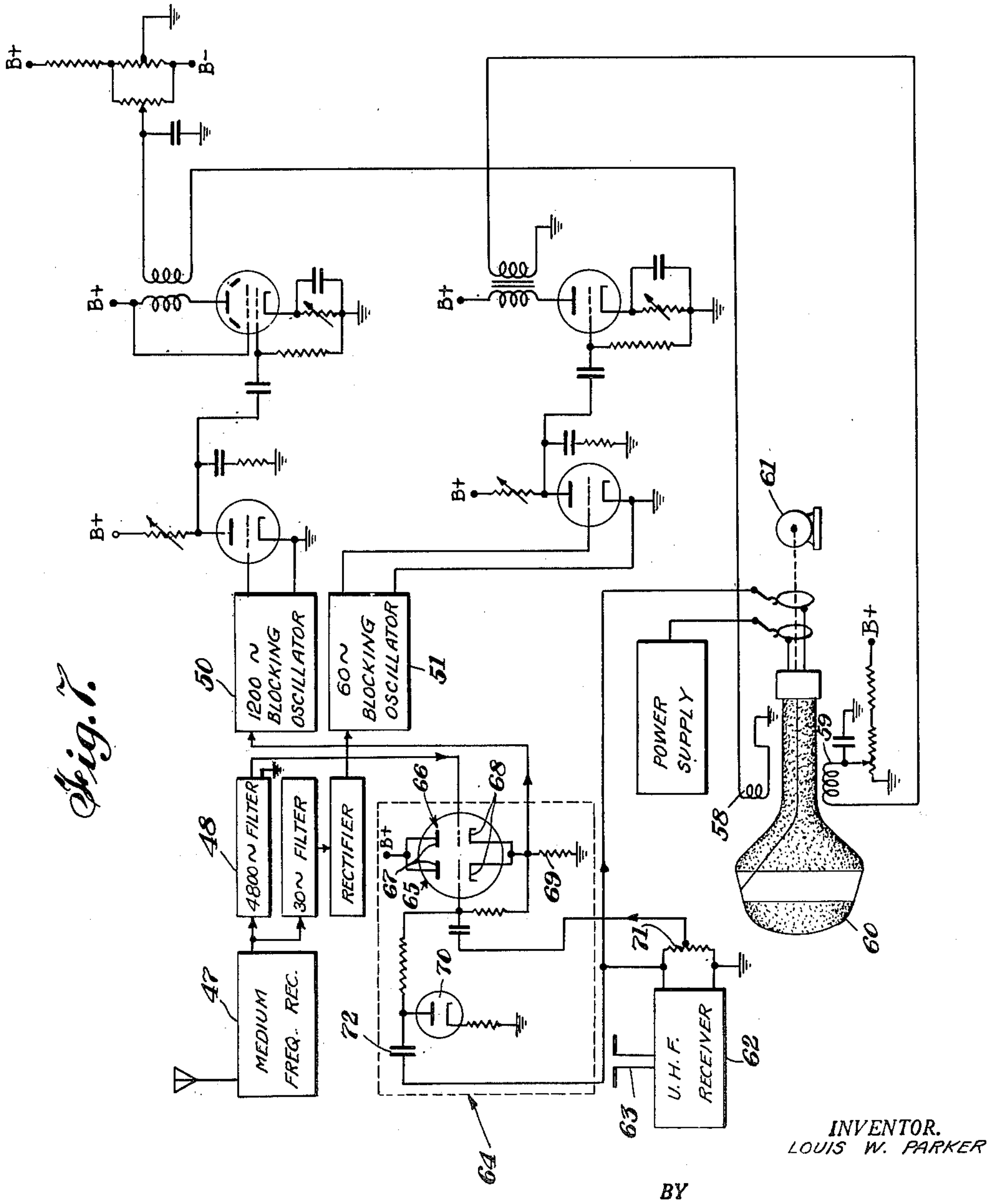
Fig. 7 is an alternative form of the receiving circuit of Fig. 6 incorporating my improved synchronizing selector for the receiver of the system.

In the receiving circuit shown in Fig. 7, the general scheme is similar to that described in Fig. 6. In this case, however, provision has been made to insure synchronization to the particular cycle of the horizontal synchronizing frequency signal, that is, of the 4800 cycle frequency, which is closest in time to the intelligence conveying pulses initially received. In the circuit of Fig. 6 the synchronization frequency is a multiple of the blocking oscillator frequency. Several cycles, therefore, of the synchronizing frequency must occur during each cycle of the blocking oscillator. Thus, the possibility exists to synchronize the blocking oscillator to any one of these cycles. It is obvious that synchronization to the wrong cycle would displace the writing on the cathode ray tube. In the case illustrated in Fig. 7, a 30 cycle frequency has been employed for vertical synchronizing while the horizontal synchronizing is achieved by the 4800 cycle frequency as before. To select the proper cycle of the synchronizing frequency, pulses picked up by the U. H. F. receiver are utilized. The circuit diagram of the synchronizing devices is shown boxed in by broken lines at 64. The output of the U. H. F. receiver 62 is applied to a triode 65 and the filtered 4800 cycle signal is fed directly to another triode 66 in the synchronizing selector. The two triodes 65 and 66 have their respective anodes 67 connected to a common potential source B+ and their respective cathodes 68 connected together to ground respectively. The ground connection includes a common cathode resistance 69. The synchronizing selector circuit is arranged such as to receive both the signal pulses and the 4800 cycle wave. The two triodes 65 and 66 act as a cathode follower type electronic switch between the 4800 cycle filter 48 and the 1200 cycle blocking oscillator 50. When pulses first start to arrive from the receiver 62 they are passed through the cathode follower 65 to the blocking oscillator 50. These pulses are also applied to a diode 70 at a higher potential, due to the provision of a voltage dividing resistance 71 across the output terminals at the receiver 62. This diode 70 causes the accumulation of a charge across a comparatively high capacity 72 in series therewith. After a few pulses the voltage across this condenser builds up to a higher value than the peak potential applied to the grid of the tube 65. This has the effect of biasing the triode 65 beyond its plate current cutoff. That is to say, the triode 65 normally has no bias on its grid when pulses are not being received. Under this condition the comparison triode 66 is almost biased to cut-off by virtue of the high voltage across the resistance 69.

As the negative bias is increased on the triode 65, the voltage across the cathode resistor 69 decreases putting triode 66 gradually into operation. Thus, in the beginning of transmission, only the first cathode follower, which receives the pulses, will operate, but after a few cycles the 4800 cycle signal takes over and the pulses are functionally eliminated. As long as pulses are being sent the triode 65 remains cut off and only the triode 66 will operate supplying the 4800 cycle signal to the 1200 cycle blocking oscillator. It can be seen from the above that if the intelligence conveying pulses are transmitted at the beginning of the horizontal sweep at the transmitter, they would start the horizontal sweeping line in the receiver at the proper instant. For the proper operation of the synchronizing selector, provision must be made at the transmitting end to send at first a few pulses at the beginning of the horizontal sweep, which may be simply done by leaving the stylus in the holder at the left side of the writing field before use. To call the central station it is only necessary to turn on the pulse transmitter without removing the stylus from its holder. This has the effect of sending out a succession of pulses which are noted in a panoramic receiver at the central station. The receiver operator tunes the pulse receiver to the proper frequency and gives the go-ahead signal over a suitable voice channel. The transmitting operator may then remove the stylus from its holder and commence the writing. Synchronization to the proper cycle in accordance with the above is thus accomplished a few tenths of a second after the pulse receiver is tuned in.

Figure 3:
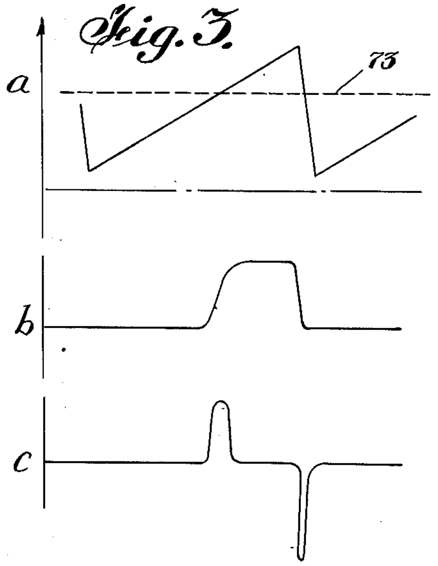
Figs. 3, 4 and 5 are a series of graphs indicating certain voltage and current conditions of the system of Fig. 1.
Figure 4:
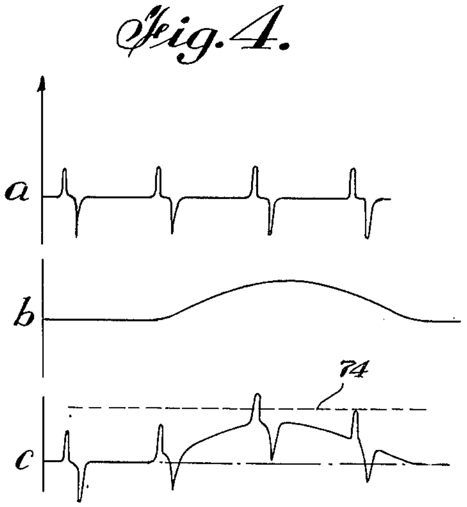
Figure 5:
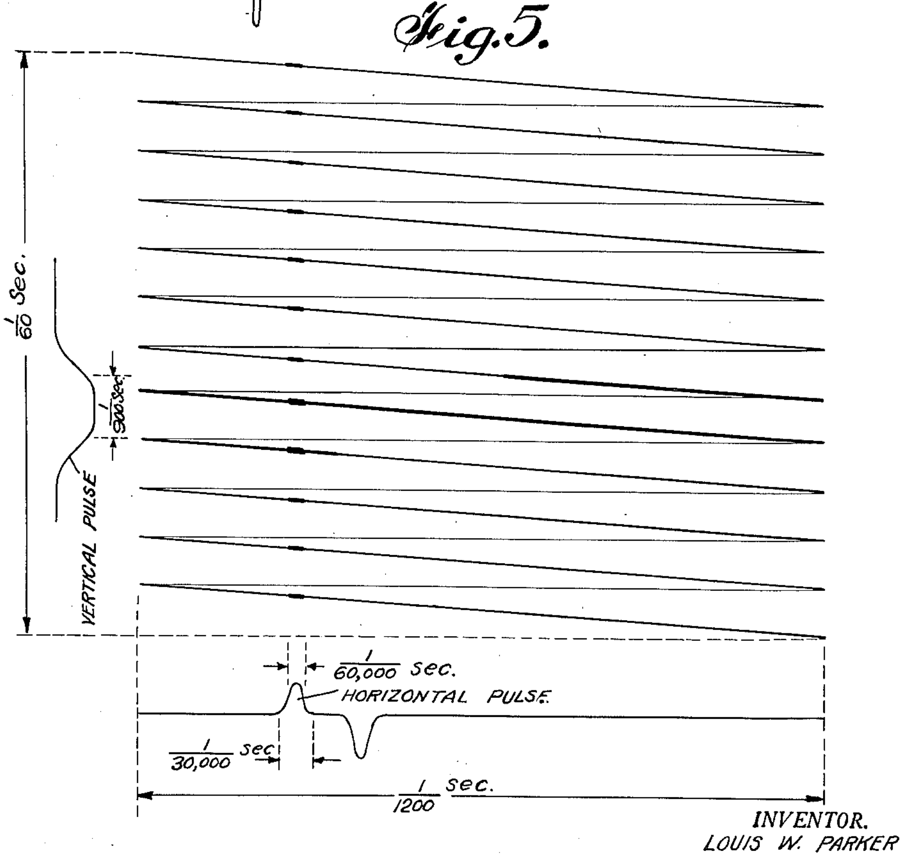

The operation of the transmitting circuit of Fig. 2 will be understood by reference to Figs. 3, 4, and 5. In Fig. 3, there is shown in graph *a* the shape of the sawtooth voltage wave as applied to the grid 30 of the high-mu triode 31, the dotted line at 73 showing the level of the D. C. voltage applied to the cathode 32. Over the portion of the wave where the voltage is substantially below the level of the cathode voltage there is no plate current. As the grid voltage rises, however, the point is reached where the plate current starts to rise from zero. With a high-mu triode this rise is rapid until the grid current equals the current through the resistance 28. After this point has been reached the plate current remains constant until discharge tube 29 starts to conduct, when the plate current again rapidly drops to zero. This is shown in graph *b* on Fig. 3. The plate current in graph *b* is subjected to differentiation in the transformer 35, whereby a voltage is generated across the transformer secondary consisting of a positive and a negative pulse in accordance with those shown in graph *c* (Fig 3). Of the positive and negative pulses only the former will be used since that is the one that changes its position with the movement of the stylus 34. The end result of motion of the stylus in the horizontal and vertical direction is a corresponding pulse which is time modulated accordingly. In graph *a* of Fig. 4, a series of significant horizontal coordinate pulses are shown, a vertical coordinate pulse being illustrated in graph *b* on the same scale and showing that the effective width of a single vertical pulse is made to be substantially as much as the duration of one and one-quarter of a horizontal line sweep period. In graph *c* of Fig. 4, the sum of the horizontal and vertical pulses is shown graphically, the dotted line at 74 indicating the cut off point of the peak rider 45. It will be apparent therefrom that only at rare intervals do the two pulses of succeeding waves or cycles get past the peak rider. Usually only one horizontal pulse effectively coincides and therefore gets through for each vertical pulse. In Fig. 5 an overall view of the interrelation of the horizontal and vertical pulses has been provided. In this figure the heavy dots on the horizontal lines show where the horizontal pulses occur and the heavy line shows the duration of the vertical pulses It is apparent that they coincide at only one point where they form an observable pulse indicative of the combined vertical and horizontal pulses. Thus the locus of such points corresponds to the successive resultant values of voltages varying with the composite horizontal and vertical movement of the stylus.

While the above is a description of the principles of this invention in connection with specific apparatus, it is to be clearly understood that this description is made only by way of example and not as a limitation on the scope of this invention.

I claim:

1. A method for producing a single channel signal for the variation of two independent unidirectional voltages comprising generating pulses modulated in position in respect to a time base associated therewith in accordance with the amplitude variation with time of each of the two independent voltages, combining the resulting pulses, and obtaining a given peak portion of those pulses which coincide as a signal indicative of the variation of said two voltages.

2. A system for obtaining a significant single channel signal indicating the amplitude variation of two independent unidirectional voltages for use with means for providing two voltages having significant amplitude variations with time, comprising means for generating pulses each modulated in respect to a time base associated therewith in accordance with the amplitude variation of each of said two independent voltages, means for combining said two time modulated pulses, and means for obtaining the peak amplitude portion of coinciding pulses 3. A telautograph transmitting system, comprising character tracing means for producing significant voltages respectively for independent horizontal and vertical movements thereof, means for producing horizontal and vertical time bases of given frequencies for said movements forming individual cyclic frames, means for producing a single pulse which is significant of both the horizontal and the vertical position of said tracing means, a pulse transmitter, and means for modulating the output of said transmitter by means of said single pulse.

4. A transmitting system according to claim 3, wherein said character tracing means includes a stylus and a potentiometer circuit controlled by the horizontal and vertical movements thereof.

5. A system according to claim 3, wherein said time base means includes a synchronizing wave source for the horizontal and the vertical coordinate 6. A system according to claim 3, wherein said single pulse producing means includes means for deriving a pulse for each of said frames which is significant of the respective horizontal of said tracing means, means for deriving a pulse for each of said frames which is significant of the vertical position of said tracing means, means for combining the said significant horizontal and vertical pulses, and means for obtaining the peak amplitude portion of coinciding pulses to produce said single pulse.

LOUIS W. PARKER.

REFERENCES CITED

The following references are of record in the file of this patent:

UNITED STATES PATENTS

| Number | Name | Date |
|---|---|---|
| 1,279,178 | Tiffany | Sept 17, 1918 |
| 2,168,047 | Skellett | Aug. 1, 1939 |
| 2,168,048 | Skellett | Aug. 1, 1939 |
| 2,168,049 | Skellett | Aug 1, 1939 |
| 2,227,596 | Luck | Jan. 7, 1941 |
| 2,231,971 | Tubbs | Feb. 18, 1941 |
| 2,280,707 | Kell | Apr 21, 1942 |
| 2,338,949 | Kupfmuller | Jan. 11, 1944 |
| 2,406,880 | Young, Jr. | Sept 3, 1946 |
| 2,411,062 | Schade | Nov. 12, 1946 |
| 2,417,286 | Bartels | Mar. 11, 1947 |
| 2,418,116 | Grieg | Apr 1, 1947 |
| 2,462,117 | Mikkelson | Feb. 22, 1949 |
| 2,490,891 | Walton | Dec. 13, 1949 |

FOREIGN PATENTS

| Number | Country | Date |
|---|---|---|
| 560,928 | Great Britain | Apr 27, 1944 |